United States Patent [19]

Satoh

[11] Patent Number: 4,520,892
[45] Date of Patent: Jun. 4, 1985

[54] TWO-WHEELED VEHICLE WITH OFFSET WHEEL

[75] Inventor: Kazuo Satoh, Saitama, Japan

[73] Assignee: Honda Giken Kogyo Kabushiki Kaisha, Tokyo, Japan

[21] Appl. No.: 467,208

[22] Filed: Feb. 17, 1983

[30] Foreign Application Priority Data

Feb. 17, 1982 [JP] Japan .................................. 57-24181

[51] Int. Cl.³ .............................................. B62K 11/02
[52] U.S. Cl. .................................. 180/219; 180/215; 280/276; 280/282; 280/284; 280/288
[58] Field of Search ............... 180/227, 228, 219, 215; 280/274, 275, 281 R, 283, 284, 288, 276, 277, 279, 282

[56] References Cited

U.S. PATENT DOCUMENTS 2,818,127 12/1957 Mason .................................. 180/215
4,159,752 7/1979 Kanno .............................. 280/282 X
4,436,174 3/1984 Morisono ............................ 180/227
4,480,711 11/1984 Satoh et al. ..................... 280/282 X

FOREIGN PATENT DOCUMENTS 808191 7/1951 Fed. Rep. of Germany ...... 280/276
813001 9/1951 Fed. Rep. of Germany ...... 280/279

Primary Examiner—Joseph F. Peters, Jr.
Assistant Examiner—Mitchell J. Hill
Attorney, Agent, or Firm—Irving M. Weiner; Pamela S. Burt

[57] ABSTRACT

A two-wheeled vehicle comprising a vehicular body inclusive structure having the center of gravity thereof deviated in either transverse direction from the vehicle center line, a steering system inclusive structure transversely turnably connected with the vehicular body inclusive structure, and front and rear wheels supported by the vehicular body and steering system inclusive structures, respectively.

Either one or both of the front and rear wheels are offset with respect to the vehicle center line, in the opposite transverse direction and in the same transverse direction as the center of gravity of the vehicular body inclusive structure, respectively. In this manner, the vehicle is permitted to travel in a straight course with a substantially upright position.

12 Claims, 3 Drawing Figures

TWO-WHEELED VEHICLE WITH OFFSET WHEEL

BACKGROUND OF THE INVENTION

1. Field of the Invention

The present invention relates generally to a two-wheeled vehicle. More particularly, the invention relates to a two-wheeled vehicle in which the inclusive structure of the vehicle body has the center of gravity thereof deviated from the vehicle center line in either transverse direction.

2. Description of Relevant Art

Two-wheeled vehicles generally comprise a steering system inclusive structure including a handlebar, a front fork and the like and provided with a front wheel, and a vehicular body inclusive structure comprising a vehicle frame, a driver's seat and the like and provided with a rear wheel. The steering system inclusive structure is transversely turnable and is pivotably connected with the vehicular body inclusive structure so as to be capable of steering operation. The connection of the steering system inclusive structure relative to the vehicular body inclusive structure is arranged such that the front fork is vertically inserted through a head pipe secured to the front end of the vehicle frame, while in order to secure straight driving operation of the vehicle the head pipe and the front fork have the axes thereof inclined with respect to the vertical direction, i.e., the front fork which bears a shaft of the front wheel at the lower end thereof has a caster angle.

Among the foregoing two-wheeled vehicles, there are those in which the vehicular body inclusive structure has the position of the center of gravity thereof deviated in either transverse direction from the vehicle center line extending longitudinally through the head pipe. Such deviation of the center of gravity is provided, for example, in two-wheeled vehicles of a motorized type which are driven by the power of an engine, in which a power unit including the engine as a constituent part thereof is arranged on either lateral side of the rear wheel.

However, if the position of the center of gravity of the vehicular body inclusive structure is deviated from the vehicle center line, the vehicular body inclusive structure tends to fall toward the gravity deviated side. For this reason, it has been proposed to check such falling by what is referred to as the "cut-in motion" of the steering system inclusive structure.

Due to the cut-in motion of the steering system inclusive structure, a twisting force caused by the caster angle acts on the vehicular body inclusive structure, thus exerting a raise-up action on the vehicular body inclusive structure such that the position of the center of gravity is corrected in the transverse direction. In this manner, the two-wheeled vehicle can be driven while the dynamic balance thereof is maintained.

As a result, corresponding to the correction of the position of the center of gravity, the entire two-wheeled vehicle inclines with respect to the vertical direction, to a slight extent, and with such inclined position travels in a straight course.

The present invention effectively overcomes the problems encountered with respect to the foregoing considerations in a vehicular body inclusive structure which has the center of gravity thereof deviated from the vehicle center line.

SUMMARY OF THE INVENTION

The present invention provides a two-wheeled vehicle comprising a vehicular body inclusive structure having the center of gravity thereof deviated in either transverse direction from the vehicle center line, a steering system inclusive structure which is transversely turnable and pivotably connected to the vehicular body inclusive structure, a rear wheel supported by the vehicular body inclusive structure, and a front wheel supported by the steering system inclusive structure, the front wheel being offset with respect to the vehicle center line in the opposite transverse direction relative to the center of gravity of the vehicular body inclusive structure.

The invention further provides a two-wheeled vehicle comprising a vehicular body inclusive structure having the center of gravity thereof deviated in either transverse direction from the vehicle center line, a steering system inclusive structure transversely turnable and pivotably connected to the vehicular body inclusive structure, a front wheel supported by the steering system inclusive structure, and a rear wheel supported by the vehicular body inclusive structure, the rear wheel being offset with respect to the vehicle center line in the same transverse direction as the center of gravity of the vehicular body inclusive structure.

An object of the invention is to provide a two-wheeled vehicle in which a vehicular body inclusive structure has the position of the center of gravity thereof deviated in either transverse direction from the vehicle center line, and which is permitted to travel in a straight course with a substantially upright position.

The above and further objects, features and advantages of the invention will become apparent from the following detailed description of a preferred embodiment of the invention, when read in conjunction with the accompanying drawings.

DETAILED DESCRIPTION OF PREFERRED EMBODIMENT

Figure 1:
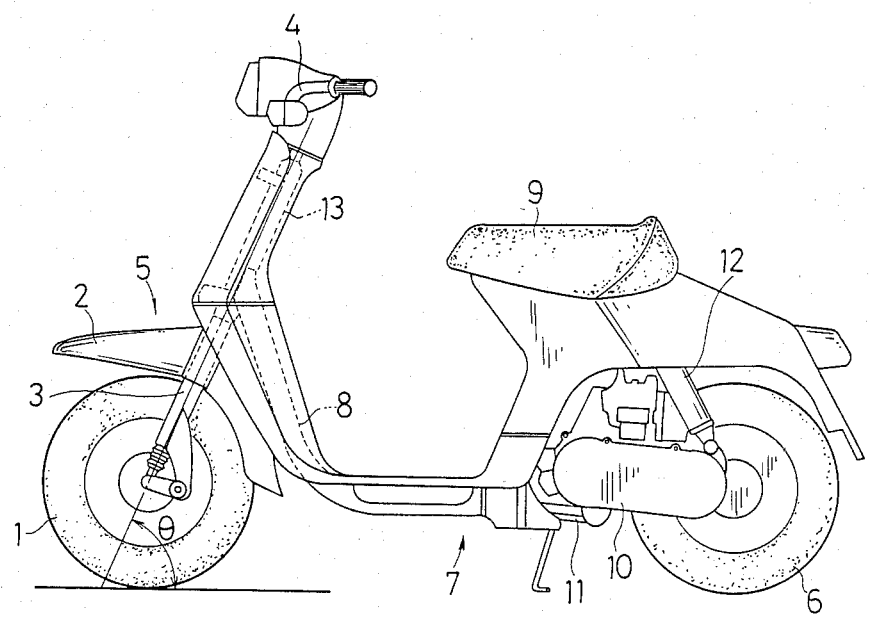
FIG. 1 is a side view of a two-wheeled vehicle according to the present invention.
Figure 2:
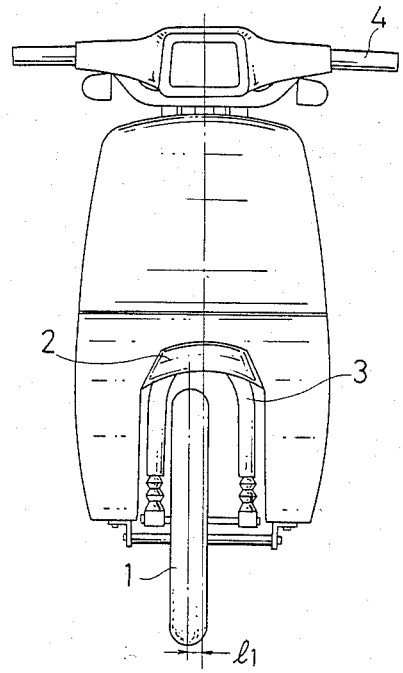
FIG. 2 is an elevational view of the two-wheeled vehicle of FIG. 1.

Referring first to FIGS. 1 and 2, designated by reference numeral 1 is a front wheel of a two-wheeled vehicle. The front wheel 1 is supported by the lower end of a front fork 3 provided with a front fender 2, the front fork 3 having at the upper end thereof a handlebar 4 connected thereto. The front fork 3, the handlebar 4, and the like, together form a steering system inclusive structure 5 provided with the front wheel 1.

A vehicular body inclusive structure 7 provided with a rear wheel 6 is formed by a vehicle frame 8, a driver's seat 9, a power unit 10 and other members. The power unit 10, which comprises an engine united with a case incorporating transmission members such as a chain for transmitting the power of the engine to the rear wheel 6, is connected by means of a connection member 11 and a damper 12 to the vehicle frame 8, while supporting at the rear end thereof the rear wheel 6.

At the front end of the vehicle frame 8 there is secured a head pipe 13 having the front fork 3 transversely turnably provided therethrough, i.e., the steering system inclusive structure 5 is transversely turnable and pivotably connected to the vehicular body inclusive structure 7 so as to be capable of steering operation. Moreover, the head pipe 13 and the front fork 3 have the axes thereof rearwardly inclined, thereby providing the front fork 3 with a caster angle $\theta$ relative to the horizontal road surface.

Figure 3:
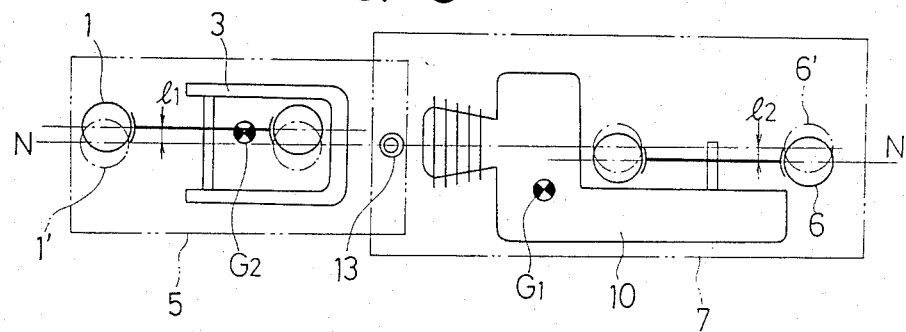
FIG. 3 is a schematic plan view of the two-wheeled vehicle of FIG. 1.

Referring now to FIG. 3, designated at N—N is a vehicle center line extending longitudinally of the two-wheeled vehicle, thus passing through the head pipe 13 amd respective positions of imaginary front and rear wheels 1', 6' when not offset, the vehicle center line being in accord with the straight advance direction of the two-wheeled vehicle. The power unit 10 is arranged on either lateral side of the rear wheel 6 and, therefore, the vehicular body inclusive structure 7 has the position of the center of gravity $G_1$ thereof deviated from the vehicle center line N—N in a first transverse direction corresponding to the uneven distribution of the power unit 10.

For this reason, the vehicular body inclusive structure 7 has a falling moment produced due to the deviation of the center of gravity $G_1$ from the vehicle center line N—N in either transverse direction, i.e., to the left in the present embodiment, and tends to incline in the same direction.

On the other hand, the front wheel 1 is offset from the vehicle center line N—N in the opposite or second transverse direction relative to the position of the center of gravity $G_1$, i.e., to the right in the present embodiment, so that an amount of offset $l_1$ is established between the front wheel 1 and the vehicle center line N—N, whereby the steering system inclusive structure 5 has the center of gravity $G_2$ thereof deviated from the vehicle center line N—N in the opposite transverse direction relative to the center of gravity $G_1$ of the vehicular body inclusive structure 7, thus setting a moment due to the center of gravity $G_2$ against the falling moment of the vehicular body inclusive structure 7 due to the center of gravity $G_1$, in order to secure an upright position of the two-wheeled vehicle.

The occurrence of the falling moment of the vehicular body inclusive structure 7 due to the deviation of the center of gravity $G_1$ from the vehicle center line N—N may be substantially avoided by offsetting the rear wheel 6. The rear wheel 6 may be offset from the vehicle center line N—N in the same first transverse direction as the position of the center of gravity $G_1$, i.e., to the left in the present embodiment, so that an amount of offset $l_2$ is established between the rear wheel 6 and the vehicle center line N—N, whereby the rear wheel 6 is brought near to or substantially on a line passing through the center of gravity $G_1$ and substantially parallel to the center line N—N. Thus, the inclination of the two-wheeled vehicle is rendered to be relatively slight or substantially zero.

The offsetting of the front wheel 1 from the vehicle center line N—N in the opposite direction relative to the center of gravity $G_1$ and that of the rear wheel 6 in the same direction as the center of gravity $G_1$ may be provided in combination by suitably setting the amounts of offset $l_1$, $l_2$, or may be provided separately.

Although there has been described what is considered to be the preferred embodiment of the invention, it will be understood that the invention may be embodied in other specific forms without departing from the spirit or essential characteristics thereof. The present embodiment is therefore to be considered in all respects as illustrative, and not restrictive. The scope of the invention is indicated by the appended claims rather than by the foregoing description.

I claim:
1. A two-wheeled vehicle, comprising:
   a vehicular body inclusive structure having the center of gravity thereof deviated in a first transverse direction from the vehicle center line;
   a steering system inclusive structure which is transversely turnable and pivotably connected to said vehicular body inclusive structure;
   a rear wheel supported by said vehicular body inclusive structure; and
   a front wheel supported by said steering system inclusive structure, said front wheel being offset with respect to said vehicle center line in a second transverse direction, opposite to said first transverse direction.
2. A two-wheeled vehicle according to claim 1, wherein:
   said rear wheel is offset with respect to said vehicle center line in said first transverse direction.
3. A two-wheeled vehicle according to claim 1, wherein:
   said vehicular body inclusive structure includes in the rear portion thereof a power unit arranged on a lateral side in said first transverse direction with respect to said vehicle center line.
4. A two-wheeled vehicle according to claim 2, wherein:
   said vehicular body inclusive structure includes in the rear portion thereof a power unit arranged on a lateral side in said first transverse direction with respect to said vehicle center line.
5. A two-wheeled vehicle according to claim 3, wherein:
   said power unit supports at the rear part thereof said rear wheel.
6. A two-wheeled vehicle according to claim 1, wherein:
   said steering system inclusive structure comprises a steering handlebar and a front fork operatively connected with said steering handlebar, said front fork supporting at the lower part thereof said front wheel.
7. A two-wheeled vehicle according to claim 2, wherein:
   said steering system inclusive structure comprises a steering handlebar and a front fork operatively connected with said steering handlebar, said front fork supporting at the lower part thereof said front wheel.
8. A two-wheeled vehicle according to claim 6, wherein:
   said front fork has an axis of turning which is inclined rearwardly.
9. A two-wheeled vehicle according to claim 8, wherein:
   said vehicular body inclusive structure has at the front end thereof a head tube secured thereto; and
   said front fork is turnably provided through said head tube.
10. A two-wheeled vehicle, comprising:
    a vehicular body inclusive structure having the center of gravity thereof deviated in a first transverse direction from the vehicle center line;

a steering system inclusive structure transversely turnable and pivotably connected to said vehicular body inclusive structure;

a front wheel supported by said steering system inclusive structure; and a rear wheel supported by said vehicular body inclusive structure, said rear wheel being offset with respect to said vehicle center line in said first transverse direction.

11. A two-wheeled vehicle according to claim 10, wherein:

said vehicular body inclusive structure includes in the rear portion thereof a power unit arranged on a lateral side in said first transverse direction with respect to said vehicle center line.

12. A two-wheeled vehicle according to claim 10, wherein:

said steering system inclusive structure comprises a steering handlebar and a front fork operatively connected with said steering handlebar, said front fork supporting at the lower part thereof said front wheel.

* * * * *